United States Patent
Sakurada et al.

(10) Patent No.: US 8,495,168 B2
(45) Date of Patent: Jul. 23, 2013

(54) SERVICE PROVISION SYSTEM FOR ELECTRONIC MUSICAL APPARATUS

(75) Inventors: Shinya Sakurada, Hamamatsu (JP);
Osamu Ohshima, Hamamatsu (JP);
Yoshinari Nakamura, Hamamatsu (JP);
Satoshi Miyake, Hamamatsu (JP);
Kenichi Nishida, Hamamatsu (JP);
Kojiro Kato, Hamamatsu (JP); Atsushi Fukada, Hamamatsu (JP)

(73) Assignee: Yamaha Corporation (JP)

(*) Notice: Subject to any disclaimer, the term of this patent is extended or adjusted under 35 U.S.C. 154(b) by 1611 days.

(21) Appl. No.: 11/689,024

(22) Filed: Mar. 21, 2007

(65) Prior Publication Data
US 2007/0226293 A1    Sep. 27, 2007

(30) Foreign Application Priority Data

Mar. 23, 2006  (JP) .................................. 2006-81155

(51) Int. Cl.
*G06F 15/16* (2006.01)
*G06F 3/00* (2006.01)

(52) U.S. Cl.
USPC ............................... 709/217; 709/219; 710/8

(58) Field of Classification Search
USPC ......................................... 709/217, 219; 710/8
See application file for complete search history.

(56) References Cited

U.S. PATENT DOCUMENTS

| | | | |
|---|---|---|---|
| 6,600,097 B2 * | 7/2003 | Shiiya | 84/609 |
| 6,632,992 B2 * | 10/2003 | Hasegawa | 84/609 |
| 6,803,511 B2 * | 10/2004 | Mizuno | 84/600 |
| 2001/0037721 A1 * | 11/2001 | Hasegawa et al. | 84/609 |
| 2003/0061115 A1 * | 3/2003 | Wachi | 705/26 |
| 2004/0064380 A1 | 4/2004 | Hiratsuka | |
| 2004/0086120 A1 * | 5/2004 | Akins et al. | 380/240 |
| 2005/0195695 A1 | 9/2005 | Yanase et al. | |

FOREIGN PATENT DOCUMENTS

| | | |
|---|---|---|
| JP | 2003-302985 A | 10/2003 |
| JP | 2004-117798 A | 4/2004 |
| JP | 2005-189611 A | 7/2005 |

OTHER PUBLICATIONS

Office Action issued in corresponding Japanese Patent Application No. 2006-081155 dated Dec. 22, 2009. Partial English translation provided.

* cited by examiner

*Primary Examiner* — Ranodhi Serrao
(74) *Attorney, Agent, or Firm* — Rossi, Kimms & McDowell LLP

(57) ABSTRACT

An electronic musical instrument and a portable terminal are connected to a wireless LAN. The wireless LAN is connected to an Internet via a router. A distribution server residing on the Internet is a server which provides Internet services. A pairing between the electronic musical instrument and the portable terminal is established to conduct Internet communications in a pair. Processes from accessing the distribution server to specifying a desired service are performed by use of the portable terminal. The distribution server distributes data corresponding to the service specified by the portable terminal to the electronic musical instrument. A user is thus allowed to use the desired service on the electronic musical instrument.

13 Claims, 7 Drawing Sheets

SERVICE PROVISION SYSTEM FOR ELECTRONIC MUSICAL APPARATUS

BACKGROUND OF THE INVENTION

1. Field of the Invention

The present invention relates to a system for providing services, the system allowing an electronic musical apparatus to use a service provided by a server apparatus residing on a communications network.

2. Description of the Related Art

It has been known that electronic musical instruments access server computers residing on the Internet to obtain various services such as a music content distribution service from the server computers (e.g., Japanese Patent Laid-Open Publication No. 2005-189611). These electronic musical instruments have not only elements for realizing capabilities as a conventional electronic musical instrument but also those for realizing capabilities as a communications terminal having a communications interface for connecting to the Internet, and a GUI (Graphical User Interface) necessary for obtaining Internet services, the GUI including a display having a relatively large display area suitable for browsing a web page, a pointing device and a web browser.

Due to various reasons such as constraints on cost, design, etc., many of electronic musical instruments simply have only a minimum of user interface without GUI necessary for obtaining the above-described Internet services. For instance, from the viewpoint of design, electronic pianos are usually designed to simply have a minimum of user interface containing only several switches and a quite simple liquid crystal display portion, avoiding exposing elements required for capabilities other than musical capabilities in order not to impair the appearance of an acoustic musical instrument. These electronic musical instruments having only the simple user interface are unable to obtain various services provided via the Internet network. Even though the electronic musical instruments obtain services, those electronic musical instruments impose inconveniences upon users.

In addition, there has been a conventional content provision system which allows a personal computer (hereinafter abbreviated as PC) connected to the Internet to access a music content distribution site residing on the Internet to download music content to transfer or copy the downloaded music content to the electronic musical instrument connected with the PC as an external apparatus in order to allow the electronic musical instrument to use the music content (e.g., Japanese Patent Laid-Open Publication No. 2004-117798). In this system, however, the PC which delivers the Internet service has to have large capacity memory for storing music content. In order to transfer or copy music content to the electronic musical instrument, in addition, the PC has to perform complicated processing such as encryption of content and authentication of the electronic musical instrument to which the content is to be transferred or copied in order to protect the rights of the music content and to protect the music content from unauthorized copying.

SUMMARY OF THE INVENTION

The present invention was accomplished to solve the above-described problems, and an object thereof is to allow an electronic musical apparatus having a simple user interface to provide a user with ease of use in obtaining various services via a communications network.

The present invention provides a service provision system for allowing an electronic musical apparatus to use a service provided by a server apparatus residing on a communications network, the service provision system comprising a communications terminal capable of communicating with the server apparatus via the communications network; the communications terminal comprising a service specifying portion for communicating with the server computer via the communications network and allowing a user to specify his desired service from among services provided by the server apparatus; and an informing portion for informing the electronic musical apparatus of a service specified by the service specifying portion; the electronic musical apparatus comprising a service requesting portion for issuing a request for the service informed by the communications terminal to the server apparatus via the communications network; and a data obtaining portion for obtaining data corresponding to the service requested by the service requesting portion from the server apparatus via the communications network.

In the present invention, the communications terminal may communicate with the server apparatus via the communications network by way of the electronic musical apparatus. In addition, the service specifying portion may include a graphical user interface contained in the communications terminal. Furthermore, the communications terminal may further comprise a pairing establishing portion for establishing a pairing with a certain electronic musical apparatus.

According to the present invention, the process for specifying a desired service from among services provided by the server apparatus is carried out by the communications terminal, while the electronic musical apparatus requests the server apparatus to deliver the service informed by the communications terminal and obtains data corresponding to the service from the server apparatus via the communications network. Even in a case where the electronic musical apparatus only has a user interface which is inadequate (simple) for use in Internet communications, therefore, the present invention enables the communications terminal to make up for the inadequacy. As a result, the present invention is quite effective in that the electronic musical apparatus is allowed to provide a user with ease of use in obtaining various services via the communications network. Furthermore, the communications terminal may communicate with the server apparatus via the communications network by way of the electronic musical apparatus. In this case as well, the process for specifying a desired service is carried out by the communications terminal, while the user uses the service on the electronic musical apparatus. In this case as well, therefore, the present invention is quite effective in that the electronic musical apparatus is allowed to provide the user with ease of use in obtaining the service. In addition, the user's operation for specifying a desired service on the communications terminal may be conducted through the use of a GUI contained in the communications terminal. By establishing a pairing between a communications terminal and a certain electronic musical apparatus by the pairing establishment portion, furthermore, the present invention allows a general-purpose communications terminal to be adopted as the communications terminal.

The present invention may be configured and embodied not only as an invention of an apparatus but also as a software program for allowing an electronic musical apparatus and a communications terminal to operate as respective apparatuses according to the present invention.

DESCRIPTION OF THE PREFERRED EMBODIMENT

An embodiment of the present invention will now be described with reference to the drawings.

Figure 1:
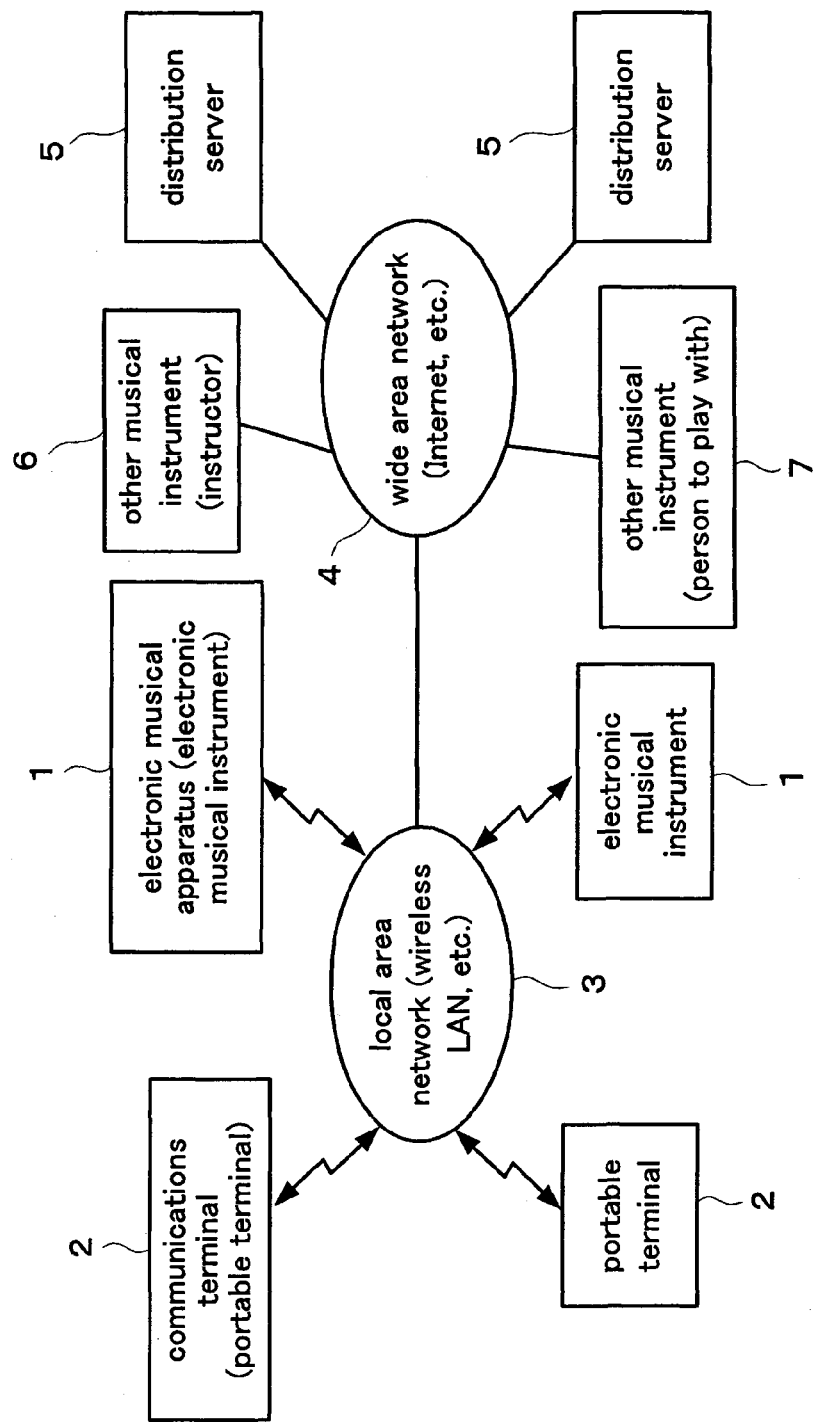
FIG. 1 is a conceptual illustration showing an overview of a system according to an embodiment of the present invention.
Figure 2:
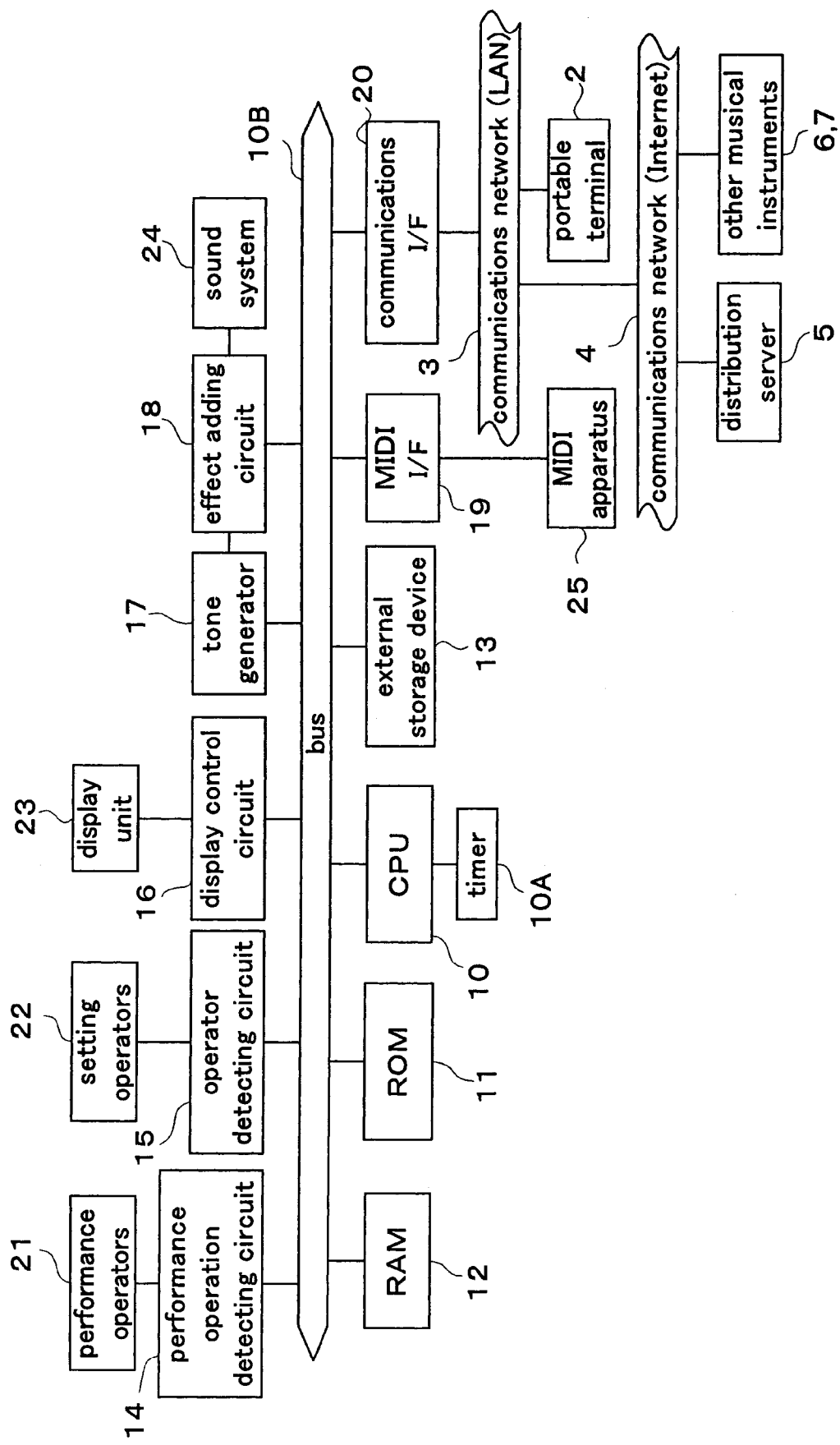
FIG. 2 is a block diagram showing an example electric hardware configuration of an electronic musical instrument according to the embodiment.

FIG. 1 is a conceptual illustration showing an example network configuration of a service provision system according to the embodiment of the present invention. An electronic musical apparatus 1 is an electronic musical instrument having a simple user interface such as an electronic piano or an electronic keyboard. An example electric hardware configuration of the electronic musical apparatus 1 is shown in FIG. 2. A communications terminal 2 is a general-purpose communications terminal having at least communications capability, a GUI including a display having a relatively large display area capable of browsing a web page, and a web browser. In this embodiment, as described later, the communications terminal 2 is preferably a mobile, small portable communications terminal (hereinafter simply referred to as portable terminal). Examples of communications terminals applicable as the portable terminal 2 include portable game machines, mobile phones, PDAs (Personal Digital Assistance: electronic personal organizer), and tablets.

The electronic musical instrument 1 and the portable terminal 2 are connected with a local area network 3 to allow data communications between the electronic musical instrument 1 and the portable terminal 2 via the local area network 3. The local area network 3 is a network constructed for a localized area such as a household LAN. This embodiment employs a wireless LAN as an example of the local area network 3. The local area network 3 may be either a wireless LAN or a wired LAN using a cable. In addition, the local area network 3 may be any network as far as communications are carried out in a localized area through the use of a specific protocol. On the wireless LAN 3, a plurality of electronic musical instruments 1 and a plurality of portable terminals 2 can reside.

The wireless LAN 3 is connected with a wide area network (in this embodiment, the Internet) 4 via a router. The electronic musical instrument I and the portable terminal 2 are connected with the Internet 4 via the wireless LAN 3 to allow communications with other apparatuses residing on the Internet 4. A server computer 5 which runs a service provision site for providing various services for client terminals via the Internet is also connected with the Internet 4. As an example of the server computer 5, this embodiment employs a music content distribution server which provides music content such as automatic performance data and music score data for the client terminals (the electronic musical instruments 1). On the Internet 4, various kinds of distribution servers 5 can reside. On the Internet 4, in addition, a plurality of other musical instruments 6, 7 can reside.

FIG. 2 is a block diagram showing an example electric hardware configuration of the electronic musical instrument 1. The electronic musical instrument 1 includes not only a microcomputer having a CPU 10, a ROM 11, a RAM 12 and a timer 10A connected with the CPU 10 but also an external storage device 13, a performance operation detecting circuit 14, an operator detecting circuit 15, a display control circuit 16, a tone generator 17, an effect adding circuit 18, a MIDI interface (MIDI I/F) 19, and a communications interface (communications I/F) 20. These elements included in the electronic musical instrument 1 are interconnected via a bus 10B.

The CPU 10 executes various software programs stored in the ROM 11 or the RAM 12 through the use of clock by the timer 10A. The software programs executed by the CPU 10 includes a control program for controlling general operation of the electronic musical instrument 1 and a program for realizing network communication control illustrated in FIG. 5 which will be described later. The RAM 12 is used as a work memory for temporarily storing various kinds of data necessary for various processes carried out by the CPU 10. In addition to the programs stored in the ROM 11 or RAM 12, the CPU 10 can execute various programs stored in the external storage device 13 or downloaded by a server computer residing on the Internet via the communications I/F 20.

The external storage device 13, which is a large-capacity storage device applicable to storing music content purchased from the distribution server 5 (see FIG. 1), may be composed of an external storage medium such as a hard disk drive (HDD), a compact disk (CD-ROM, etc.), a flexible disk (FD), a magneto-optical disk (MO), a digital versatile disk (DVD), and a semiconductor memory.

The performance operation detecting circuit 14, which is connected to performance operators 21 which are a keyboard or the like, detects performance operation made by use of the performance operators 21 and generates performance information in accordance with the detected performance operation. The operator detecting circuit 15 is connected to setting operators 22. The setting operators 22 are simple operators such as numeric/cursor keys and panel switches for selecting a tone color. The operator detecting circuit 15 detects operation and settings made by use of the setting operators 22 and generates setting information in accordance with the detected operation.

The display control circuit 16 is connected to a display unit 23. The display unit 23, which is composed of a liquid crystal display or the like, is a simple display having a narrow display area which only allows display of relatively simple information such as display of tone color, accompaniment style, song name, score, lyrics, etc. The display control circuit 16 controls what is displayed on the display unit 23 on the basis of instructions made by the CPU 10.

The tone generator 17 generates musical tone signals on the basis of performance information generated in accordance with user's operation of the performance operators 21 or performance information generated in accordance with reproduction of a song file (automatic performance data or the like). The musical tone signals generated by the tone generator 17 are provided with an effect by the effect adding circuit 18 and emitted from a sound system 24 composed of amplifiers, speakers, etc. A tone generating portion composed of the tone generator 17, the effect adding circuit 18 and the sound system 24 may be configured by a conventionally known configuration. In addition, the tone generator 17 may be configured by a conventionally known scheme.

The MIDI I/F 19 is an interface for transmitting and receiving automatic performance data (MIDI data) of MIDI format between an externally connected additional MIDI apparatus 25 and the electronic musical instrument 1. In addition to the MIDI I/F 19 configured by a specifically designed MIDI interface, the MIDI I/F 19 may be configured by a general-purpose interface such as RS-232C, USB (Universal Serial Bus), and IEEE1394. When configured by the general-purpose interface, the MIDI I/F 19 may transmit and receive data other than MIDI data between the additional MIDI apparatus 25 and the electronic musical instrument 1.

The communications I/F 20 is an interface for connecting to a communications network such as a LAN and the Internet. The electronic musical instrument 1 according to this embodiment has a wireless LAN card as the communications I/F 20 to allow connection with the wireless LAN 3 via the communications I/F 20, the wireless LAN 3 being connected to the Internet 4 via a router as already explained with reference to FIG. 1. The above-described configuration allows the electronic musical instrument 1 to communicate with the portable terminals 2 residing on the wireless LAN 3 and other apparatuses (the distribution servers 5, etc.) residing on the Internet 4.

Figure 3:
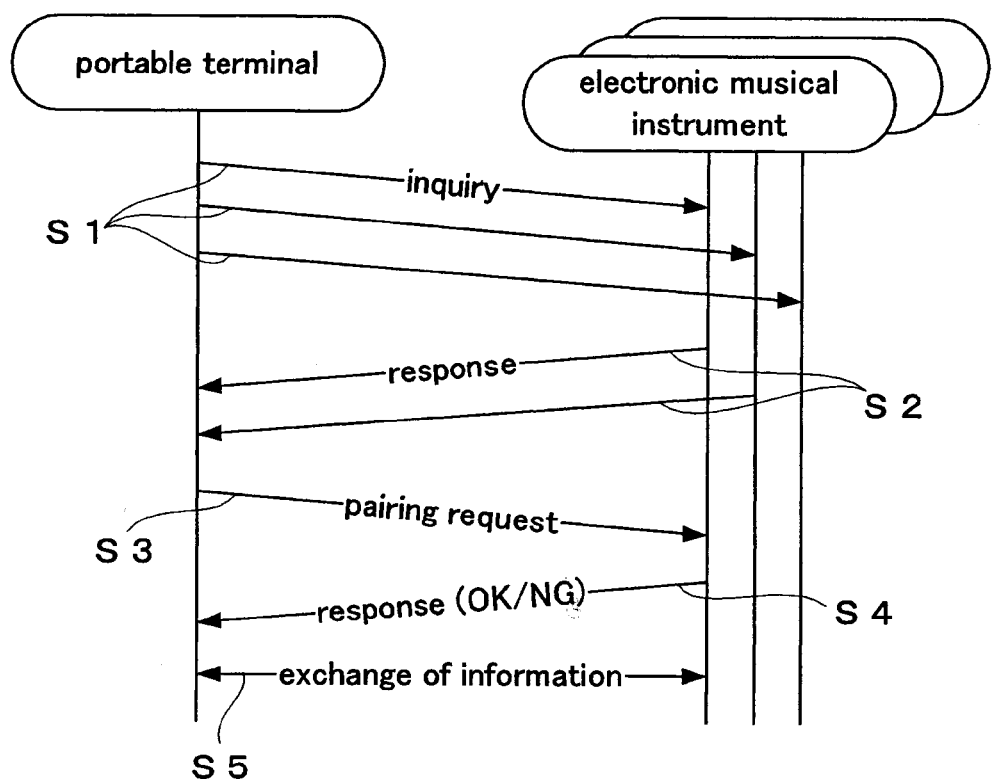
FIG. 3 is a flowchart showing an example procedure of a "pairing establishment process" according to the embodiment.

As shown in FIG. 1, the plurality of the portable terminals 2 and the plurality of the electronic musical instruments 1 can reside on the wireless LAN 3. The user conducts a pairing establishment process for identifying the electronic musical instrument 1 which will be paired with the portable terminal 2 in order to establish a pairing between the two apparatuses to allow communication therebetween. FIG. 3 is a flowchart showing an example procedure of the pairing establishment process. In FIG. 3, in which it is assumed that a plurality of apparatuses including the plurality of the electronic musical instruments 1 reside on the wireless LAN 3, operation of the portable terminal 2 is shown in parallel with operation of the electronic musical instruments 1.

If the user operates the portable terminal 2 to input instructions to start a pairing establishment (to identify an apparatus with which the portable terminal 2 is paired), the process shown in FIG. 3 starts. In FIG. 3, the portable terminal 2 makes an inquiry to all the apparatuses residing on the wireless LAN 3. This inquiry, which is made in order to grasp the existence of the electronic musical instruments 1 which are capable of communicating with the portable terminal 2 on the wireless LAN 3, is a message requesting a response to the inquiry. This inquiry may be either broadcast to all the apparatuses residing on the wireless LAN 3 or made to the respective apparatuses residing on the wireless LAN 3 one by one (step S1).

The respective electronic musical instruments 1 which have received the inquiry from the portable terminal 2 send back a response to the inquiry to the portable terminal 2, while those which are incapable of communicating with the portable terminal 2 or interpreting the inquiry, or whose power is turned off do not send back a response to the inquiry to the portable terminal 2. On the basis of the response (or absence of the response), the portable terminal 2 grasps the existence of the electronic musical instruments 1 with which the portable terminal 2 is possibly paired on the wireless LAN 3 (step S2).

The portable terminal 2 issues a request for a pairing to one of the responded electronic musical instruments 1 (step S3). The electronic musical instrument 1 to which the request is issued may be freely selected from among the responded electronic musical instruments 1 by the user. Alternatively, the electronic musical instrument 1 to which the request is issued may be previously defined for the portable terminal 2.

In a case where the user selects one of the electronic musical instruments 1, the pairing request is sent to the user's selected electronic musical instrument 1 in accordance with user's selecting operation. In a case where one of the electronic musical instruments 1 is previously defined, a reception of the response from the defined electronic musical instrument 1 may cause the portable terminal 2 to automatically issue a pairing request to the electronic musical instrument 1.

The electronic musical instrument 1 which has received the pairing request from the portable terminal 2 transmits, to the portable terminal 2, a response indicating whether or not the electronic musical instrument 1 accepts the pairing request from the portable terminal 2 (step S4). The response indicating whether or not the pairing request from the portable terminal 2 is to be accepted may be determined by the user. Alternatively, the response indicating whether or not the pairing request is to be accepted may be previously defined for the electronic musical instrument 1.

If the portable terminal 2 receives a response indicating that the pairing request is accepted from the electronic musical instrument 1 (if OK at step S4), information on specifications such as model information and ID information given on the network is exchanged between the portable terminal 2 which has issued the pairing request and the electronic musical instrument 1 which has accepted the request (step S5). On the exchange of the information, the pairing between the portable terminal 2 and the electronic musical instrument 1 is established. At the above-described step S5, the information on the specifications are exchanged with one another, however, step S5 may be modified such that the portable terminal 2 only receives the specification information of the electronic musical instrument 1 without sending its own information. If the electronic musical instrument 1 has not accepted the pairing request (if NG at step S4), the portable terminal 2 may send a pairing request to a different one of the electronic musical instruments 1 or stop the paring establishment process. The above-described process enables the portable terminal 2 residing on the wireless LAN 3 to selectively establish a pairing with a specific one of the electronic musical instruments 1 residing on the wireless LAN 3.

Figure 4:
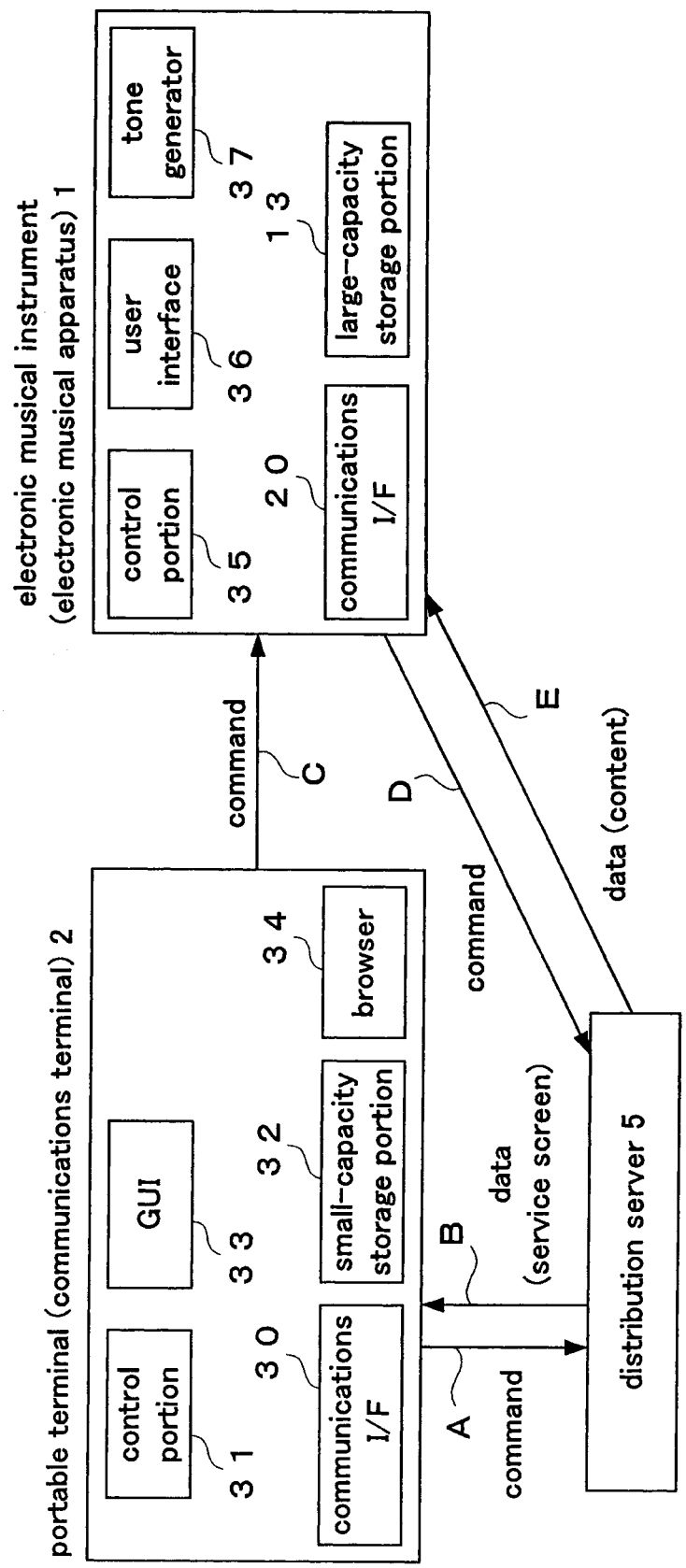
FIG. 4 is a functional block diagram illustrating a first embodiment of the embodiment.

The above-described process shown in FIG. 3 allows the portable terminal 2 and the electronic musical instrument 1 between which a pairing has been established to carry out Internet communications in a pair. FIG. 4 is a functional block diagram showing a first embodiment of the service provision system according to the invention. Arrows "A" through "E" indicate a communication flow among the apparatuses.

As described above, the portable terminal 2 is a general-purpose small portable communications terminal. As an example, in this embodiment, a portable game machine is used as the portable terminal 2. As shown in FIG. 4, the portable terminal 2 has at least a communications I/F 30 for enabling communications with a different apparatus via the wireless LAN 3 and the Internet 4, a control portion 31 including a CPU, a small-capacity storage portion 32 composed of a memory such as a Flash memory and RAM, a GUI 33 including a display for displaying a web page and a mechanism for performing various input operations on the display (e.g., operators such as pointing device and a touch-screen input operation mechanism such as touch-panel display unit), and a program (browser) 34 for making a message to a web server and controlling the display of web pages. The control portion 31 executes various software programs stored in a memory such as ROM, RAM or the small-capacity storage portion 32 to control the entire operation of the portable terminal 2 as well as to control network communications which will be shown in FIG. 5 as an example. The portable terminal 2, which is a general-purpose communications terminal, does not basically have the capability of communicating with the electronic musical instrument 1. Therefore, a software program for communicating with the electronic musical instrument 1 is installed on the small-capacity storage portion 32 in order to enable the portable terminal 2 to act as a communications terminal specifically designed for the electronic musical instrument 1.

In addition, FIG. 4 shows the configuration of the electronic musical instrument 1 with the communications capability thereof being focused. As explained with reference to FIG. 2, more specifically, the electronic musical instrument 1 has the communications I/F 20, a control portion 35 including the CPU 10, a simple user interface 36 composed of the setting operators 22 and the display unit 23, the large-capacity storage portion (external storage device) 13, and a tone generating portion 37 for electronically generating musical tones. The distribution server 5 is a server computer which runs a web site for distributing music content to the client terminals (electronic musical instruments 1) via the Internet 4.

According to this embodiment, the user accesses the distribution server 5 residing on the Internet 4 by use of the portable terminal 2 to browse a web page provided by the distribution server 5 and to issue various requests to the distribution server 5 through the use of the GUI 33 of the portable terminal 2 (flows shown by arrows "A" and "B" in FIG. 4). In this embodiment, the user is allowed to conduct operations necessary for specifying his desired service through the use of the GUI 33 of the portable terminal 2. By communicating via the wireless LAN 3 with the electronic musical instrument 1 with which the portable terminal 2 is paired (flow shown by arrow "C" in FIG. 4), in addition, the portable terminal 2 remotely controls communications between the electronic musical instrument 1 and the distribution server 5 via the Internet 4. More specifically, the user informs the electronic musical instrument 1 of the user's specified service through the use of the portable terminal 2 to enable the electronic musical instrument 1 to cause the distribution server 5 to distribute data corresponding to the informed service to the electronic musical instrument 1 to allow the user to use, on the electronic musical instrument 1, the service distributed from the distribution server 5 (flows shown by arrows "D" and "E" in FIG. 4).

Figure 5:
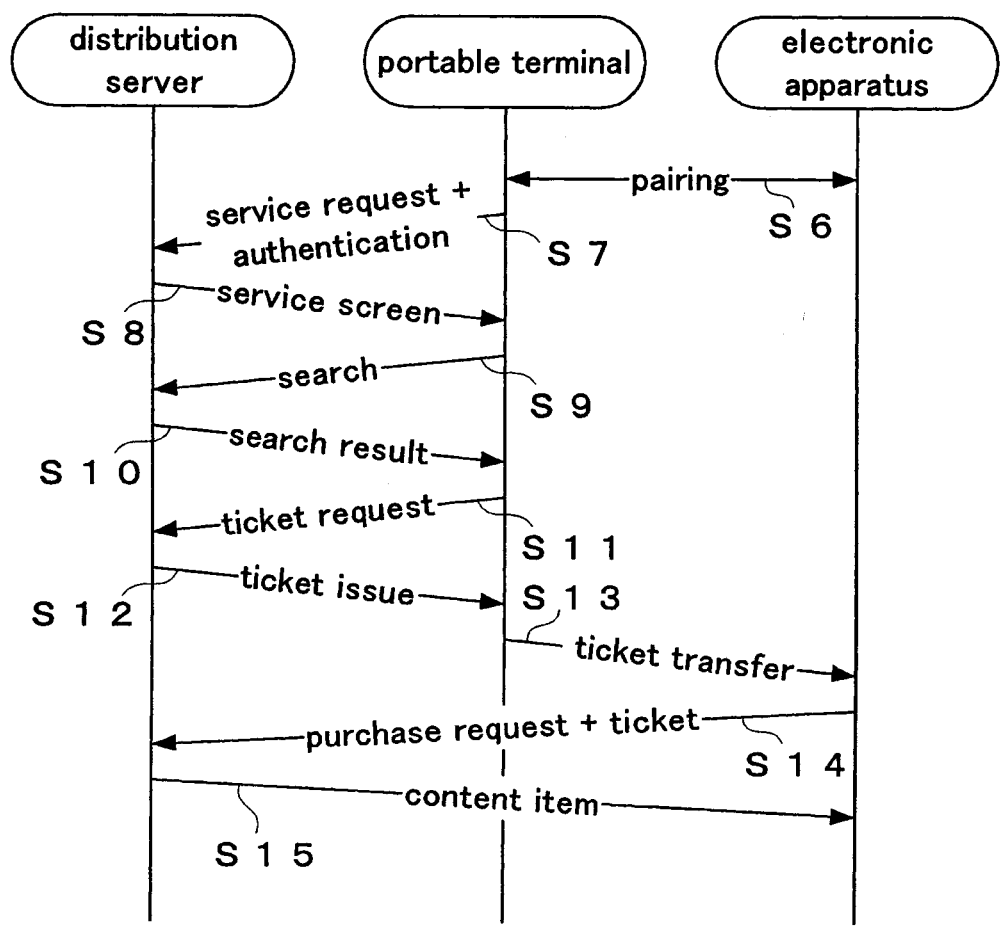
FIG. 5 is a flowchart showing an example communications procedure among apparatuses according to the first embodiment.

FIG. 5 is a flowchart of an example procedure of communications among the electronic musical instrument 1, the portable terminal 2 and the distribution server 5 (arrows "A" through "E" in FIG. 4). FIG. 5 shows operations of the respective apparatuses in parallel. With reference to FIG. 5, the procedure for providing a service via the Internet according to the first embodiment will be described. By the process described with reference to FIG. 3, a pairing is previously established between the portable terminal 2 and the electronic musical instrument 1 (step S6). The user accesses a web site provided by the distribution server 5 through the use of the browser 34 of the portable terminal 2. More specifically, a URL address of the web site of the distribution server 5 is input on the browser 34, while a request message for a service and user's authentication information is sent to the distribution server 5 corresponding to the input URL address (step S7). The user's authentication information is ID information specific to the individual portable terminal 2, a user ID for logging in the web site or the like. In response to the service request, the distribution server 5 transmits information on a web page (service screen) of the web site provided by the distribution server 5 to the portable terminal 2 (step S8). A typical example of the web page information is a data file including text data and image data composing the web page.

On receiving the web page information transmitted from the distribution server 5, the portable terminal 2 causes the browser 34 to display the service screen of the web site on the basis of the received web page information on the display of the GUI 33. Because the actual operation for displaying the screen is controlled by the control portion 31, more specifically, the browser 34 provides what is to be displayed on the basis of the information for the control portion 31. As described above, since it is assumed in this embodiment that the distribution server 5 is a server which runs a music content distribution site, the step S9 causes the display of the GUI 33 to display a screen for searching for a music content item provided by the music content distribution site. On the screen for searching for a music content item displayed on the display of the GUI 33, the user is allowed to conduct an input operation (input of a keyword for the search, input of a song name, etc.) necessary for searching for his desired music content item by use of the input mechanism of the GUI 33 to transmit a search request corresponding to the input operation from the portable terminal 2 to the distribution server 5 (step S9). The distribution server 5 then sends back a search result corresponding to the received search request to the portable terminal 2 (step S10).

The portable terminal 2 then causes the display of the GUI 33 to display the received search result. The user is allowed to specify, by use of the input mechanism of the GUI 33, his desired music content item from among the search result displayed on the display of the portable terminal 2. After the specification of the user's desired music content item from among the search result displayed on the display, the portable terminal 2 transmits a ticket request for purchasing the specified music content item to the distribution server 5 (step S11). In other words, the above-described steps S7 through S11 enable the user to specify his desired music content item from among services (music content items) provided by the distribution server 5 by use of the portable terminal 2. These steps function as a service specifying portion.

On receiving the ticket request from the portable terminal 2, the distribution server 5 carries out a certain billing process for the portable terminal 2 to collect a fee from the user for the user's desired music content item for which the ticket request has been issued. After the billing process, the distribution server 5 transmits the requested ticket to the portable terminal 2 ("issue of a ticket" of step S12). More specifically, a "ticket" indicates information such as a password necessary for obtaining a music content item (song data) in return at a later-described purchase process. In response to a purchase request, the distribution server 5 is to distribute data on the music content item corresponding to the "ticket" to the user. In order to bill the portable terminal 2, any scheme such as card payment and web money may be adopted. Prior to use of the music content distribution service, the distribution server 5 may require each user to previously register a person who will be billed and a payment method.

The portable terminal 2 transfers the ticket received from the distribution server 5 to the electronic musical instrument 1 with which a pairing has been established to inform the electronic musical instrument 1 of the service specified by the user as well as to instruct the electronic musical instrument 1 to access the distribution server 5 (step S13). On receiving the ticket and the access instruction, the electronic musical instrument 1 transmits a request for purchase of the music content item and the transferred ticket along with ID information of the electronic musical instrument 1 to the distribution server 5 (step S14). These steps request the distribution server 5 to provide, via the Internet 4, the electronic musical instrument 1 with the service corresponding to the ticket. The ID information of the electronic musical instrument 1 indicates an ID number unique to the apparatus, an ID number of the large-capacity storage portion (the external storage device shown in FIG. 2), or the like.

On receiving the purchase request, ticket and ID information from the electronic musical instrument 1, the distribution server 5 carries out a process for protecting rights of the music content item corresponding to the received ticket by constructing an arrangement for protecting rights by use of the ID information of the electronic musical instrument 1 in order to prevent unauthorized use (e.g., illegal copying or unauthorized data distribution) of the music content item, and then distributes the right-protected music content item (song data) to the electronic musical instrument 1 (step S15). The data to be distributed to the electronic musical instrument 1 may be either downloaded or streamed. When the music content is downloaded, the music content can be stored in the large-capacity storage portion 13 of the electronic musical instrument 1. When the music content is streamed, the music content is temporarily stored in a buffer memory of the RAM 12 but will not be stored in the large-capacity storage portion 13. Since the distributed music content item has been subjected to the process for protecting the rights by use of the ID information unique to the electronic musical instrument 1, the electronic musical instrument 1 is allowed to use the distributed music content item. In other words, the user is allowed to use the music content item, that is, the user is allowed to reproduce the automatic performance data on the electronic musical instrument 1 and to display music score data on the display unit 23, the data being purchased from the distribution server 5 via the Internet 4.

The above-described steps are the data exchanges among the electronic musical instrument 1, the portable terminal 2 and the distribution server 5 according to the first embodiment of the invention. In the flowchart of FIG. 5, the steps S7, S9 and S11 correspond to the communications indicated by the arrow "A" of FIG. 4, while the steps S8, S10 and S12 correspond to the communications indicated by the arrow "B" of FIG. 4. The step S13 corresponds to the communications indicated by the arrow "C" of FIG. 4, while the step S14 corresponds to the communications indicated by the arrow "D" of FIG. 4. In addition, the step S15 corresponds to the communications indicated by the arrow "E" of FIG. 4.

According to the above-described first embodiment, the processes from accessing the web site run by the distribution server 5 to specifying a desired music content item provided in the web site are performed through the use of the GUI 33 of the portable terminal 2, while it is the electronic musical instrument 1 that receives the desired music content item (song data) distributed by the distribution server 5. In other words, the above-described first embodiment enables the sharing of necessary Internet communications with the portable terminal 2. Due to the Internet communications carried out in conjunction with the portable terminal 2, therefore, the first embodiment is quite effective in that even the electronic musical instrument 1 only having the simple (inadequate for use in Internet services) user interface 36 is allowed to provide the user with ease of use in obtaining Internet services.

In the embodiment shown in FIG. 5, the billing process is carried out by the distribution server 5 in response to the ticket request from the portable terminal 2 (step S11), however, the distribution server 5 may carry out the billing process in response to the purchase request from the electronic musical instrument 1 (step S14).

In the first embodiment shown in FIG. 5, moreover, in response to the ticket issued to the portable terminal 2 by the distribution server 5 (step S12), the portable terminal 2 transfers the ticket to the electronic musical instrument 1 in real time (step S13). More specifically, the first embodiment is configured such that an issue of a ticket to the portable terminal 2 causes, in real time, a distribution of a music content item to the electronic musical instrument 1. However, the portable terminal 2 may store the ticket issued by the distribution server 5 at step S12 to carry out the process later of transferring the ticket to the electronic musical instrument 1 (step S13). More specifically, the first embodiment may be configured such that an issue of a ticket to the portable terminal 2 causes, in non-real time, a distribution of a music content item to the electronic musical instrument 1.

Figure 6:
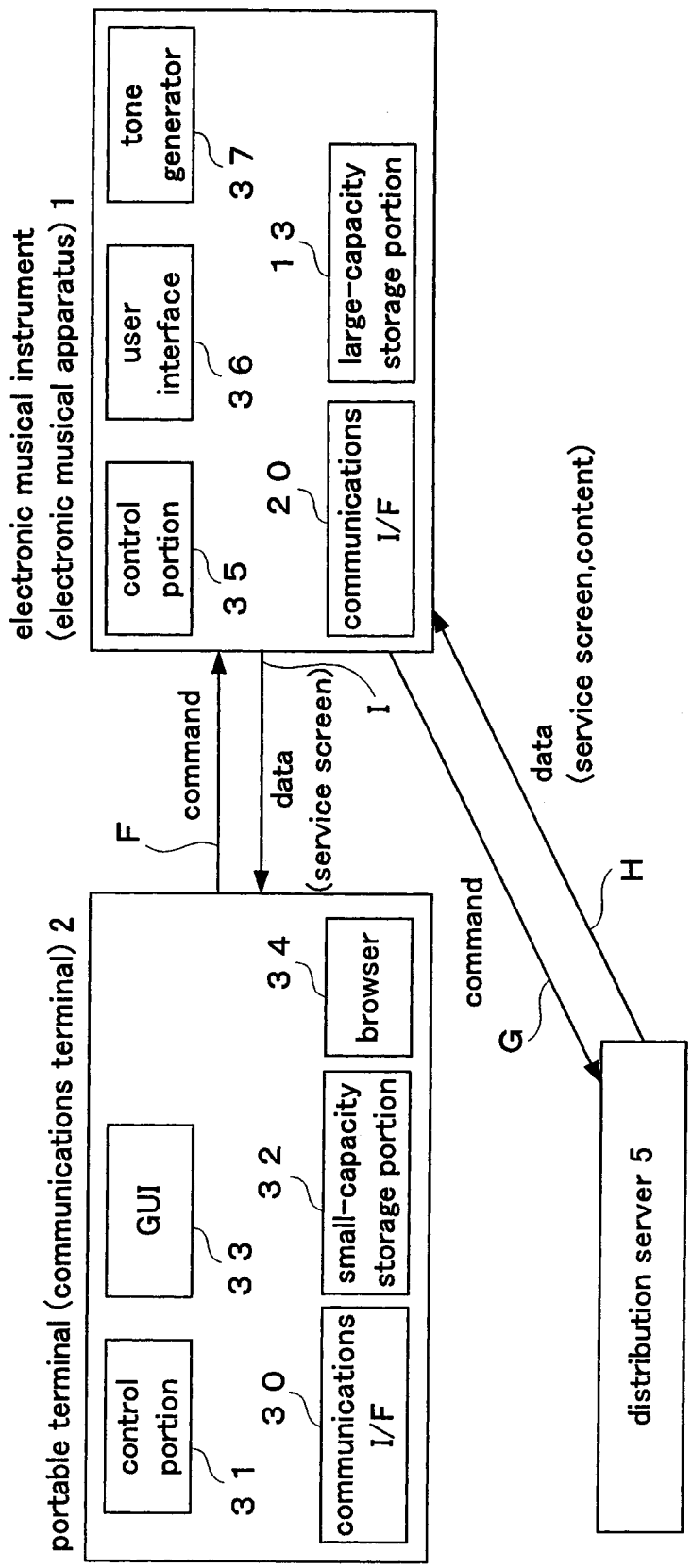
FIG. 6 is a functional block diagram illustrating a second embodiment of the embodiment.
Figure 7:
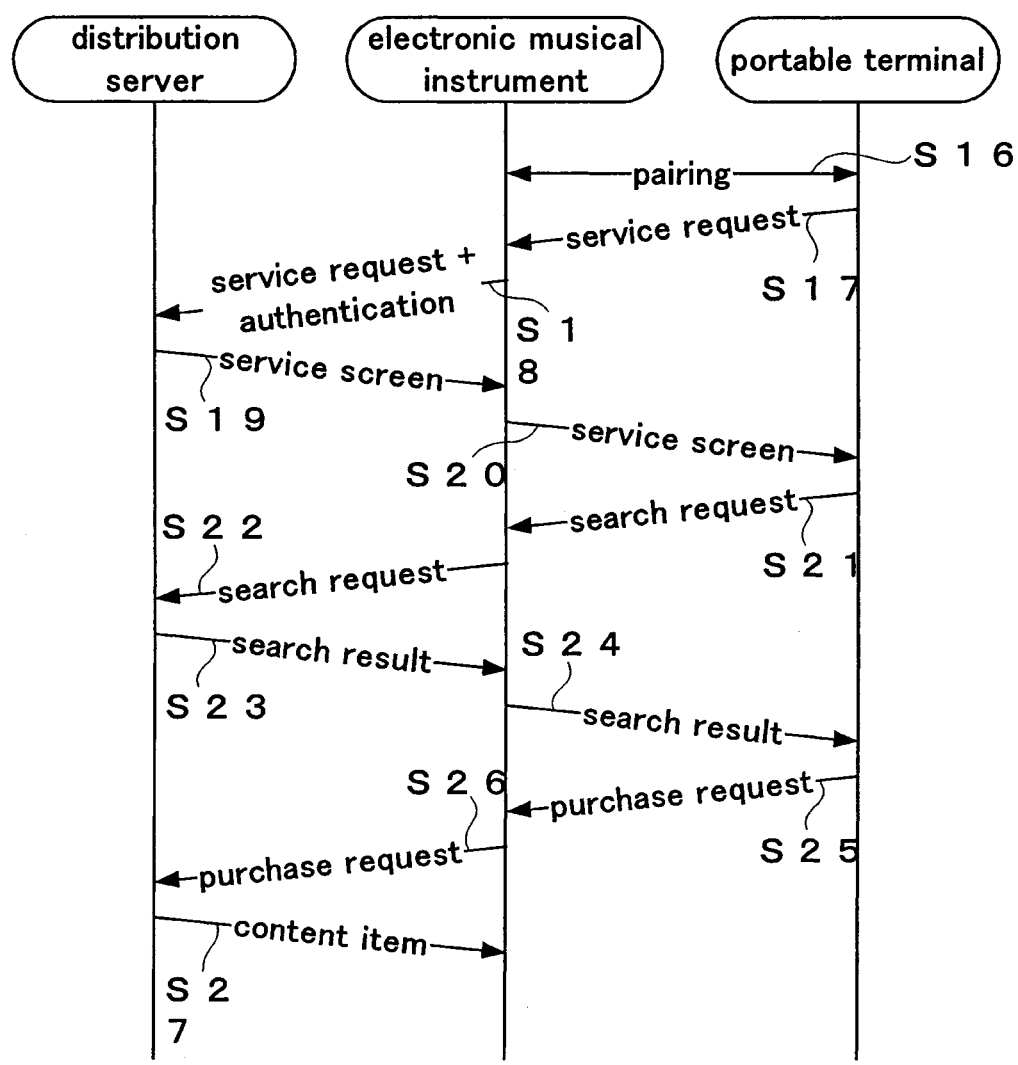
FIG. 7 is a flowchart showing an example communications procedure among apparatuses according to the second embodiment.

FIG. 6 is a block diagram illustrating a second embodiment of the service provision system according to the invention. Arrows "F" through "I" indicate a communication flow among the apparatuses. Because elements of the respective apparatuses are similar to those shown in FIG. 4, the elements shown in FIG. 6 are provided with the same numerals as those provided for FIG. 4 to omit descriptions thereof. FIG. 7 is a flowchart of an example procedure of communications (arrows "F" through "I") shown in FIG. 6 among the electronic musical instrument 1, the portable terminal 2 and the distribution server 5. FIG. 7 shows operations of the respective apparatuses in parallel.

In the first embodiment described with reference to FIG. 4 and FIG. 5, as shown by the communications flows indicated by the arrows "A", "B" of FIG. 4, communications for the processes from accessing the web site run by the distribution server 5 to specifying a desired music content item provided in the web page (service screen) provided by the distribution server 5 are carried out between the portable terminal 2 and the distribution server 5. In the second embodiment which will be described with reference to FIG. 6 and FIG. 7, however, an example in which the portable terminal 2 communicates with the distribution server 5 by way of the electronic musical instrument 1 via the Internet 4 at all times is shown.

As shown in FIG. 7, the portable terminal 2 which has established a pairing with the electronic musical instrument 1 (step S16) sends a request asking the distribution server 5 for a service to the electronic musical instrument 1 (step S17). The electronic musical instrument 1 then sends the request for the service received from the portable terminal 2 along with user's authentication information to the distribution server 5 (step S18). The user's authentication information is ID information unique to the individual electronic musical instrument 1, for example. Alternatively, the authentication information may be ID information unique to the portable terminal 2, a user ID for logging in the web site or the like, as in the case of the first embodiment. When the ID information of the portable terminal 2 or the login ID is used as the authentication information, the information may be transmitted along with the service request from the portable terminal 2 to the electronic musical instrument 1 at step S17. Alternatively, the information may be transmitted from the portable terminal 2 to the electronic musical instrument 1 at the establishment of the pairing at step S16.

The distribution server 5 transmits information on a web page corresponding to the received service request to the electronic musical instrument 1 (step S19). The information on the web page is then transferred to the portable terminal 2 by way of the electronic musical instrument 1 (step S20). The user browses a service screen (screen for searching for his desired music content item) provided on the basis of the web page information on the portable terminal 2 and makes a request for a search for his desired music content item on the service screen (step S21). The search request from the portable terminal 2 is transmitted by way of the electronic musical instrument 1 to the distribution server 5 (step S22). The distribution server 5 sends back a search result corresponding to the search request to the electronic musical instrument 1 (step S23). The search result is then transferred to the portable terminal 2 by way of the electronic musical instrument 1 (step S24). The user specifies his desired music content item on the basis of the search result transferred by the electronic musical instrument 1 and issues a request for purchasing the specified music content item (step S25), the specification and the request being made on the portable terminal 2. The request for purchase made on the portable terminal 2 is transmitted to the distribution server 5 by way of the electronic musical instrument 1 (step S26). In a case where the ID information unique to the electronic musical instrument 1 has not been delivered to the distribution server 5 as the user authentication information at step S18, the ID information unique to the electronic musical instrument 1 is transmitted along with the request for purchase. On receiving the request for purchase, the distribution server 5 carries out a certain billing process to collect a fee from the user for the user's desired music content item for which the purchase request has been issued, and also carries out a process for protecting rights of the music content item for which the purchase request has been issued to construct an arrangement by use of the ID information of the electronic musical instrument 1 in order to protect rights of the music content item. After the processes, the music content item (song data) for which the purchase request has been issued is delivered to the electronic musical instrument (step S27). The user is allowed to use the music content item, that is, the user is allowed to reproduce automatic performance data on the electronic musical instrument 1 and to display music score data on the display unit 23, the data being purchased from the distribution server 5 via the Internet 4.

The above-described steps are the data exchanges among the electronic musical instrument 1, the portable terminal 2 and the distribution server 5 according to the second embodiment. In the flowchart of FIG. 7, the steps S17, S21 and S25 correspond to the communications indicated by the arrow "F" of FIG. 6, while the steps S18, S22 and S26 correspond to the communications indicated by the arrow "G" of FIG. 6. The steps S19, S23 and S27 correspond to the communications indicated by the arrow "H" of FIG. 6, while the steps S20 and S24 correspond to the communications indicated by the arrow "I" of FIG. 6. According to the second embodiment, the communications between the portable terminal 2 and the distribution server 5 are done by way of the electronic musical instrument 1 to specify a desired music content item listed on the web site provided by the distribution server 5, issue a request for distribution of the specified music content item to the distribution server 5 by way of the electronic musical instrument 1, and distribute the music content item from the distribution server 5 to the electronic musical instrument 1. Therefore, the second embodiment is also quite effective in that even the electronic musical instrument 1 only having the simple user interface 36 is allowed to provide the user with ease of use in obtaining Internet services.

Since the portable terminal 2 serves the function of browsing web pages and the like, the first and second embodiments eliminate the electronic musical instrument 1 having to have not only a sophisticated GUI such as a display having a large display area but also a browser. As a result, the first and second embodiments achieve reduction of costs required for the communications capabilities of the electronic musical instrument 1 capable of obtaining Internet services.

In the first and second embodiments, in addition, since the pairing establishment process shown in FIG. 3 makes a pairing between the electronic musical instrument 1 and the portable terminal 2, a general-purpose communications terminal is allowed to be used as the portable terminal 2. Therefore, the first and second embodiments have the advantage of eliminating the need for a dedicated communications terminal for the electronic musical instrument 1. In addition, the above-described embodiment shows the example in which a pairing is established between one portable terminal 2 and one electronic musical instrument 1, however, a pairing may be established between plural portable terminals 2 and one electronic musical instrument 1. In this case, the electronic musical instrument 1 may be allowed to obtain different kinds of Internet services by allowing each of the portable terminals 2 to communicate with one of the distribution servers 5 to individually seek a different kind of Internet service. The pairing establishment process shown in FIG. 3 may be modified such that a request for pairing is sent along with information on the specifications (model information) of the portable terminal 2 to the electronic musical instrument 1 at step S3 while it is determined at step S4 on the basis of the information on the specifications received at step S3 whether the electronic musical instrument 1 accepts the pairing request.

In the first and second embodiments, in addition, since a music content item (song data) is directly distributed from the distribution server 5 to the electronic musical instrument 1 (step S15 of FIG. 5 and step S27 of FIG. 7), the portable terminal 2 is not involved in the distribution of the music content item. Since the conventional art shown in Japanese Patent Laid-Open Publication No. 2004-117798, for example, requires a personal computer to download a music content item and then copy the downloaded content item to the electronic musical instrument 1, the personal computer has to have a large-capacity memory for storing content and also has to carry out a complicated process (process for protecting rights) required for copying of a content item. According to the above-described embodiments, however, it is the electronic musical instrument 1 that receives a distributed music content item, eliminating the portable terminal 2 having to have a large-capacity memory. Since the complicated process for protecting rights can be carried out by the distribution server 5, in addition, the above-described embodiments can simplify processes to be executed by the portable terminal 2. As a communications terminal, therefore, the simple small mobile portable terminal 2 can be adopted.

The above-described embodiment shows an example in which a small portable apparatus such as a portable game machine, a mobile phone, and a PDA is adopted as an example of a communications terminal. However, general-purpose communications terminals such as a personal computer may be adopted. It is preferable for the user to conduct various kinds of work relating to the service provision system at the place where the electronic musical instrument 1 which obtains the Internet service is located. That is the reason why the communications terminal to be paired with the electronic musical instrument 1 is preferably the small mobile portable terminal 2.

The above-described embodiment shows, as an example of the distribution server 5, a server which provides services for distributing music content such as automatic performance data and music score data. However, the distribution server 5 may be a server which provides karaoke service, music lessons, music sessions, various music or sound services such as voice chat, or various data (e.g., waveform data to be used by a tone generator, and parameters) and programs to be used by the electronic musical instrument 1. In a case of the music lesson service, for instance, the user takes a music lesson on the electronic musical instrument 1 via the Internet, the lesson being provided by the other musical instrument (instructor) 6 residing on the Internet 4(see FIG. 1). In this case, the music lesson service may be arranged such that the user conducts, on the portable terminal 2, preliminary procedures required prior to the start of the lesson such as the selection of a lesson and an instructor, and connection with the instructor musical instrument 6, while the user takes the lesson on the electronic musical instrument 1. In a case of the music session service, the user is allowed to play music on the electronic musical instrument 1 via the Internet 4 in concert with the other musical instruments (players with whom the user plays music) 7 residing on the Internet 4 (see FIG. 1). In this case, the music session service may be arranged such that the user conducts, on the portable terminal 2, preliminary procedures required prior to the start of the session such as a search for possible players with whom the user may play music, a selection of a player with whom the user plays music, and a connection with the musical instrument 7 on which the player plays music, while the user plays a session (exchanges of performance information in real-time via the Internet 4) on the electronic musical instrument 1.

As the electronic musical instrument 1, the present invention may adopt not only an electronic musical instrument having a keyboard such as an electronic piano and an electronic keyboard but also any other electronic musical instruments. In addition to electronic musical instruments, any electronic musical apparatus having communications capabilities such as acoustic apparatuses including digital audio mixer, automatic performance piano and karaoke apparatus can be adopted as the electronic musical instrument 1.

The above-described embodiment shows a case where the invention is configured and embodied as an invention of an apparatus. However, the invention may be configured and embodied as a method or program for allowing the electronic musical apparatuses and the communications terminals to carry out operations according to the invention.

What is claimed is:

1. A service provision system comprising:
a server apparatus providing a plurality of services;
an electronic musical apparatus communicable with the server via a communications network; and
a portable communications terminal communicable with the server apparatus via the communications network,
wherein the portable communications terminal comprises:
 a user interface having a display;
 a service specifying portion for communicating with the server apparatus via the communications network and allowing a user to specify via the user interface a desired service from among services provided by the server apparatus; and
 an informing portion for informing the electronic musical apparatus of the service specified by the service specifying portion, and
wherein the electronic musical apparatus comprises:
 a service requesting portion for issuing a request for the service informed by the communications terminal to the server apparatus via the communications network; and
 a data obtaining portion for obtaining data corresponding to the service requested by the service requesting portion directly from the server apparatus via the communications network,
wherein the portable communications terminal is separate from the electronic musical apparatus and communicates with the electronic musical apparatus via the communications network.

2. A service provision system according to claim 1, wherein:
the display displays a screen for searching for a content item provided by the server apparatus to allow the user to conduct input operation necessary for searching for the desired content item;
the service specifying portion includes a transmitting portion for a search request corresponding to the input operation to the server apparatus and a receiving portion for a search result by the server apparatus.

3. A service provision system according to claim 1, wherein the service specifying portion carries out communication between the communications terminal and the server apparatus.

4. A service provision system according to claim 1, wherein:
the server requesting portion transmits ID information of the electronic musical apparatus to the server apparatus, and
the server apparatus receives the ID information transmitted from the electronic musical apparatus, carries out a process for protecting rights of a music content item by use of the received ID information and distributes the right-protected music content item to the electronic musical apparatus.

5. A service provision system according to claim 1, wherein:
the service specifying portion receives a ticket for using the service provided by the server apparatus from the server apparatus and transmits the received ticket to the electronic musical apparatus, and
the service requesting portion for issuing the request for the service with the received ticket to the server apparatus.

6. A service provision system according to claim 5, wherein:
the communications terminal further comprises a storing portion, and
the service specifying portion stores the received ticket temporally in the storing portion, and transmits the stored ticket later to the electronic musical apparatus.

7. A service provision system according to claim 1, wherein:
the communications terminal is a general-purpose communications terminal, and
the communications terminal is communicable with the electronic musical apparatus via a software program for communicating with the electronic musical apparatus installed in the general-purpose communication terminal.

8. A service provision system according to claim 1, wherein the communications terminal further comprises a pairing establishing portion for establishing a pairing with the electronic musical apparatus.

9. A service provision system according to claim 1, wherein the service provided by the server apparatus is a service for distributing a musical content to the electronic musical apparatus.

10. A service provision system according to claim 1, wherein the service provided by the server apparatus is a service for providing a music lesson on the electronic musical apparatus via the communications network.

11. A service provision system according to claim 1, wherein the service provided by the server apparatus is a music cession service for providing a concert with other musical instruments residing on the communications network via the communications network.

12. A service provision system according to claim 1, wherein the electronic musical apparatus is an electronic musical instrument.

13. A service provision system according to claim 1, wherein the portable terminal is any one of a portable game machine, a mobile phone, a personal digital assistance, or a tablet.

* * * * *